March 22, 1960  W. E. KOMINIC ET AL  2,929,432
METHOD AND APPARATUS FOR FILLING TIRES WITH LIQUID
Filed June 20, 1957
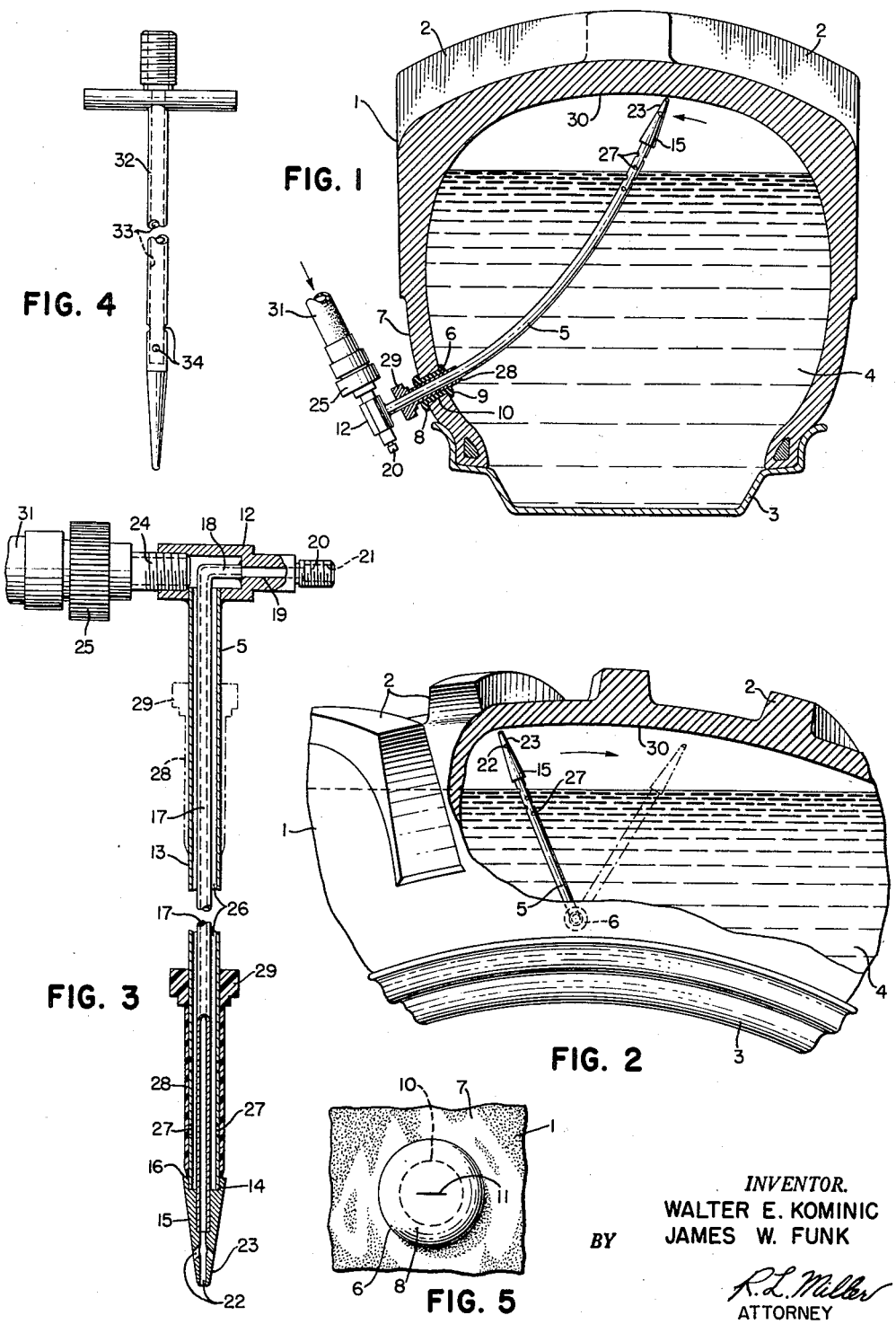
INVENTOR.
WALTER E. KOMINIC
JAMES W. FUNK
BY
R. L. Miller
ATTORNEY

United States Patent Office 2,929,432
Patented Mar. 22, 1960

2,929,432

METHOD AND APPARATUS FOR FILLING TIRES WITH LIQUID

Walter E. Kominic and James W. Funk, Cuyahoga Falls, Ohio, assignors to The Goodyear Tire & Rubber Company, Akron, Ohio, a corporation of Ohio Application June 20, 1957, Serial No. 666,966

5 Claims. (Cl. 152—415)

This invention relates to a method and apparatus for filling a tubeless tire with liquid and more particularly it relates to a method and apparatus for filling a tubeless tire having means for venting air from the tire as it is filled with liquid. It is well-known that a tire which is completely filled with liquid has many advantages. Its use on tractors and implements, such as farm implements, is particularly advantageous. Many methods and apparatus are disclosed in the prior art for filling tractor tires with liquid but these disclosures contain inherent disadvantages which make the filling operation an involved and tedious operation or they do not permit filling the tire with liquid to 100% of its capacity. United States Patent 2,320,042 discloses a method and apparatus for removing and replacing the tire valve core before and after the filling operation. In United States Patent 2,304,776 a considerable amount of liquid escapes from the tire between the time injection of liquid is ended and a cap is placed on the valve through which liquid has been injected.

An object of this invention is to provide a method and apparatus for filling a tubeless tire to 100% of the capacity thereof.

A further object of the invention is to provide a simple and quick means for connecting and disconnecting a liquid conduit to a tubeless tire assembly having means for simultaneously venting air as liquid is injected into the tire.

A further object of the invention is to provide an apparatus for filling a tubeless tire with liquid and simultaneously venting air which may be removed from the tire without loss of liquid from the tire.

The invention will be further described in connection with the accompanying drawings in which Fig. 1 is a cross-sectional view of a tubeless tractor tire showing the apparatus of this invention in plan view.

Fig. 2 is a side elevational view similar to Fig. 1 with parts broken away to show the movement of the tubular needle for removing the last residue of air from the tire.

Fig. 3 is an enlarged longitudinal cross-sectional view of the apparatus of this invention.

Fig. 4 is a plan view of the apparatus of this invention used to evacuate liquid from the tire.

Fig. 5 is an enlarged plan view of the solid rubber grommet extending through the tire sidewall. Assuming that the tire 1, which for purposes of illustration is a tubeless tractor tire having heavy lugs 2 thereon, is mounted on the rim 3. The chamber 4 formed by the tire 1 and rim 3 may be filled with liquid by means of the rigid needle generally referred to by the numeral 5 as shown in Fig. 3. The tire and rim assembly is provided with a rubber grommet valve 6, preferably in the sidewall 7 of the tire 1. As shown in Figs. 1 and 5, the grommet 6 is provided with an outer flange 8 and inner flange 9 which bear respectively against the inner and outer surfaces of the sidewall 7, and preferably the neck 10 of the grommet 6 is wider in diameter in unstressed condition than the opening in the side wall through which the grommet extends. The grommet thereby seals the hole in the sidewall 7 against the passage of air or liquid, and since the neck portion 10 thereof is under compression the longitudinally extending slit 11 is also sealed against passage of liquid or air therethrough.

The tubular needle 5 comprises a base member 12 having a first rigid tube 13 secured thereto. The outer end 14 of the tube 13 is connected to a head 15 which is frusto-conical in shape and is provided with an annular shoulder or flange 16. A second rigid tube 17 extends through the first rigid tube 13 in concentric relationship thereto with the ends thereof secured respectively to the head 15 and the base member 12. The inner end 18 of the tube 17 extends in a lateral direction relative to the axis of the tube 13 and the end 18 is secured to an outlet 19 in the base member 12. The outlet 19 is provided with a nipple 20 having a conventional valve core 21 secured therein. It is, thus, seen that the tube 17 forms a passageway extending from the valve 21 and communicating with orifices 22 in the apex 23 of the head 15.

The base member 12 is also provided with a nipple 24 secured thereto and having a water hose coupling 25 mounted thereon. It is seen that a fluid may pass from the coupling 25 through the nipple 24, through the base member 12, and through the passageway 26 formed by the radially outer surface of the rigid tube 17 and the radially inner surface of the tube 13. The passageway 26 communicates with a plurality of holes or orifices 27 extending through the tube 13 and located adjacent to the head 15.

Preferably, a sleeve 28 is mounted concentrically with the rigid tube 13 and is adapted to slide on the tube 13 between the shoulder 16 and the base member 12. For reasons hereinafter more fully set forth, the sleeve 28 is preferably made of a plastic, such as Teflon, having a low coefficient of friction with metal and preferably being only semi-rigid so that it can conform to the variable curvature of the needle 5.

With the valve 6 located in the sidewall 7 of the tire 1 adjacent to the rim 3, it is preferred that the tubular needle 5 be longitudinally curved with a relatively large radius of curvature so that in operative position, as shown in Fig. 1, the apex 23 of the head 15 may be manipulated so as to be located at the extreme upper portion of the chamber 4.

In operation, the sleeve 28 is positioned as shown in Fig. 3 so that the end thereof bears against the shoulder 16 of the head 15. If desired, a suitable lubricant, such as glycerin, is applied to the tubular needle 5 and the head 15 is inserted through the slit 11 of the valve 6. The operator pushes on the head 29 of the sleeve 28 until the sleeve 28 is positioned as shown in Fig. 1 with the tire positioned so that the valve is in its uppermost position and with the head 29 bearing against the outer flange 8 of valve 6 to thereby prevent the sleeve from being forced through the slit 11. The operator then grasps the base member 12 and pushes the tubular needle 5 relative to the sleeve 28 until the head 15 engages the crown area 30 of the tire 1.

A hose 31 is then connected to the hose coupling 25 and liquid under pressure is pumped or injected through the passageway 26 to the orifices 27 and hence to the chamber 4. As the chamber 4 is filled with liquid, air is intermittently or continuously vented through the orifice 22 and the head 15, through the rigid tube 17 and through the valve 21 to the atmosphere. After the chamber 4 has become substantially filled with liquid, the residual volume of air may be vented therefrom by oscillating and/or pivoting the needle 5 in the direction of the arrows shown in Figs. 1 and 2 so that the head 15 is swept across the crown area 30 of the tire in both longitudinal and transverse directions. Since the valve 6 is made of rubber, the needle 5 may be pivoted about the valve and, obviously, the operator may also grasp the base member 12 and twist or rotate the needle 5 so that the head 15 is swept across the crown 30 as described. When all of the air has been vented from the tire a valve (not shown) connected to the hose 31 is closed to cut off the liquid pressure and the tubular needle is simply pulled through the valve 6 by grasping the base member 12. As the needle 5 is being removed from the valve 6, the shoulder 16 of the head 15 will engage the inner end of the sleeve 28 and the sleeve 28 will thereby be removed from the valve 6 simultaneously with the needle 5.

It is to be noted that the sleeve 28 is long enough to extend from the shoulder 16 to a point axially beyond the orifices 27 so that the orifices 27 are covered by the sleeve 28 as the needle 5 is pulled out of the valve 6. Thus, liquid from within the chamber 4 cannot flow from the innermost orifice to the outermost orifice 27 as the needle 5 is being removed. It is seen that the needle 5 may be easily and quickly removed from the valve 6 without loss of liquid from the chamber 4.

Should it be desired to add liquid to the chamber 4 or to remove liquid from the chamber 4, the hose 31 is connected to a needle 32, shown in Fig. 4, having a passageway 33 extending axially thereof and terminating at orifices 34 at the inner end thereof. The needle 32 is simply pushed through the slit 11 of the valve 6 and liquid is pumped into or removed by gravity from the chamber 4. In this manner sufficient liquid may be removed from the tire to permit the tire to be removed from the rim 3 or sufficient liquid added to raise the tire pressure to operating pressures of 25 to 45 p.s.i.

Obviously, liquid may also be removed from chamber 4 by use of the needle shown in Fig. 3. The tire is positioned so that valve 6 is in its lowermost position and the needle inserted through the valve in the manner previously described. Pressurized air is then forced through valve 21, tube 17 and orifice 22 which in turn forces the liquid out of the chamber by way of orifices 27, tube 13 and hose coupling 25.

While certain representative embodiments and details have been shown for the purpose of illustrating the invention, it will be apparent to those skilled in this art that various changes and modifications may be made therein without departing from the spirit or scope of the invention.

We claim:

1. Apparatus for filling a pneumatic tire with liquid comprising in combination a tubeless tire and rim assembly forming a chamber to be filled with liquid, a rubber valve having a longitudinal slit therein communicating with said chamber, a rigid tube of smaller diameter than said rubber valve extending through said slit in the valve, said tube having a conical head at the forward end thereof and an orifice in said head, said tube extending from said valve to the crown portion of said tire, said tube having a first passageway communicating with the orifice in said head and a second passageway isolated from said first passageway and communicating with an orifice disposed in said tube adjacent the head thereof, means for connecting said first passageway to the atmosphere, means for connecting said second passageway to a supply of liquid and a plastic sleeve mounted on said tube and extending through said rubber valve, said sleeve having a flange at one end engaging the outer portion of the valve to prevent the sleeve from passing completely through the valve.

2. An apparatus as claimed in claim 1 in which said tube comprises a pair of elongated concentrically disposed inner and outer tubular members, said first passageway being defined by the inner tubular member, said second passageway being defined by the outer surface of said inner tubular member and the inner surface of the outer tubular member.

3. An apparatus as claimed in claim 1 in which said tube head is provided with a radially extending flange for engagement with the forward end of said sleeve during removal of the tube from the valve, said sleeve being disposed to cover the orifice communicating with said second passageway.

4. An apparatus as claimed in claim 1 in which said valve extends through the sidewall of said tire and said tube extends arcuately from said valve to the crown of said tire whereby pivoting said tube about said valve causes the forward end of said tube to sweep a substantial area of the crown of said tire to thereby completely vent air from the tire.

5. A method of filling the air chamber of a tubeless tire and rim assembly with a liquid, comprising inserting a rigid arcuate air venting tube into said chamber, injecting liquid into the chamber until the chamber is substantially filled, and rotating said tube relative to its axis so that the end of said tube passes longitudinally and transversely across the crown of the said tire whereby the remaining pockets of air trapped within the chamber are vented therefrom.

References Cited in the file of this patent

UNITED STATES PATENTS

| | | |
|---|---|---|
| 840,469 | Berry | Jan. 8, 1907 |
| 1,307,173 | Anthony | June 17, 1919 |
| 2,116,622 | Eisenmenger | May 10, 1938 |
| 2,222,047 | Snyder | Nov. 19, 1940 |
| 2,311,901 | Palko | Feb. 23, 1943 |
| 2,710,623 | Kolos | June 14, 1955 |